United States Patent
Sun

(10) Patent No.: US 12,222,609 B2
(45) Date of Patent: Feb. 11, 2025

(54) DISPLAY PANEL AND DISPLAY DEVICE

(71) Applicants: Nanjing BOE Display Technology CO., LTD., Jiangsu (CN); BOE Technology Group Co., Ltd., Beijing (CN)

(72) Inventor: Guanglan Sun, Beijing (CN)

(73) Assignees: NANJING BOE DISPLAY TECHNOLOGY CO., LTD., Nanjing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/017,528

(22) PCT Filed: Dec. 30, 2021

(86) PCT No.: PCT/CN2021/142771
§ 371 (c)(1),
(2) Date: Jan. 23, 2023

(87) PCT Pub. No.: WO2023/123144
PCT Pub. Date: Jul. 6, 2023

(65) Prior Publication Data
US 2024/0264494 A1    Aug. 8, 2024

(51) Int. Cl.
*G02F 1/1343*    (2006.01)
*G02F 1/1335*    (2006.01)

(52) U.S. Cl.
CPC .. *G02F 1/134345* (2021.01); *G02F 1/133512* (2013.01); *G02F 1/133514* (2013.01); *G02F 1/13439* (2013.01)

(58) Field of Classification Search
None
See application file for complete search history.

(56) References Cited

U.S. PATENT DOCUMENTS 8,432,522 B2 *   4/2013   Mori ................. G02F 1/136209
                                                                                   349/141
9,461,073 B2    10/2016   Xu et al.
(Continued)

FOREIGN PATENT DOCUMENTS

CN    103792741 A    5/2014
CN    105158993 A    12/2015
(Continued)

OTHER PUBLICATIONS

International Search Report dated Sep. 29, 2022, issued in counterpart International application No. PCT/CN2021/142771, with English translation. (6 pages).
(Continued)

*Primary Examiner* — Ryan Crockett
(74) *Attorney, Agent, or Firm* — WHDA, LLP

(57) ABSTRACT

A display panel including a plurality of sub-pixel units disposed on a first base substrate is provided, wherein a size of an opening region of a first sub-pixel unit along a first direction is greater than that of a second sub-pixel unit; wherein at least one of the sub-pixel units includes a first electrode provided with at least one slit extending along the first direction, and an orthographic projection of the slit on the first base substrate is located within a range of an orthographic projection of the opening region of the sub-pixel unit on the first base substrate; and wherein a size of the slit in the first sub-pixel unit along a second direction intersecting the first direction is smaller than that in the second sub-pixel unit. A display device is further provided.

12 Claims, 4 Drawing Sheets

(56) References Cited

U.S. PATENT DOCUMENTS

| | | | |
|---|---|---|---|
| 10,209,583 | B2 | 2/2019 | Guo et al. |
| 10,394,090 | B2 | 8/2019 | Wang |
| 10,831,055 | B2 | 11/2020 | Higashi |
| 10,923,543 | B1* | 2/2021 | Chen ................... H10K 59/123 |
| 2012/0056915 | A1* | 3/2012 | Shibazaki ............... G09G 5/06 |
| | | | 345/89 |
| 2013/0154911 | A1 | 6/2013 | Chen et al. |
| 2016/0027798 | A1 | 1/2016 | Xu et al. |
| 2016/0216566 | A1* | 7/2016 | Park ................. G02F 1/133753 |
| 2017/0176819 | A1* | 6/2017 | Park ................. G02F 1/134363 |
| 2017/0219867 | A1* | 8/2017 | Guo ................... G02F 1/13394 |
| 2019/0011788 | A1 | 1/2019 | Wang |
| 2019/0227394 | A1 | 7/2019 | Higashi |
| 2022/0223663 | A1* | 7/2022 | Wen ...................... H10K 59/38 |

FOREIGN PATENT DOCUMENTS

| | | |
|---|---|---|
| CN | 106526990 A | 3/2017 |
| CN | 209311832 U | 8/2019 |
| CN | 213690177 U | 7/2021 |

OTHER PUBLICATIONS

Written Opinion dated Sep. 29, 2022, issued in counterpart International application No. PCT/CN2021/142771. (3 pages).

* cited by examiner

DISPLAY PANEL AND DISPLAY DEVICE

TECHNICAL FIELD

The present disclosure relates to a field of display technology, and in particular to a display panel and a display device.

BACKGROUND

At present, with the development of display technology, it is increasingly desired to design red, green, and blue (RGB) sub-pixels with different aperture ratios in a display panel. The sub-pixels having different the aperture ratios would have different transmittances, which will greatly affect the image quality (such as color shift, etc.) of the display panel. Therefore, how to improve an adverse effect caused by the difference in aperture ratio between the sub-pixels has become an urgent technical problem to be solved.

SUMMARY

In view of the above, the present disclosure provides a display panel and a display device.

According to a first aspect of the present disclosure, a display panel is provided, including:
- a plurality of sub-pixel units disposed on a first base substrate, wherein the plurality of sub-pixel units includes a first sub-pixel unit and a second sub-pixel unit, and a size of an opening region of the first sub-pixel unit along a first direction is greater than a size of an opening region of the second sub-pixel unit along the first direction;
- wherein at least one of the sub-pixel units includes a first electrode disposed on the first base substrate, the first electrode is provided with at least one slit extending along the first direction, and an orthographic projection of the slit on the first base substrate is located within a range of an orthographic projection of the opening region of the sub-pixel unit on the first base substrate; and
- wherein a size of the slit in the first sub-pixel unit along a second direction is smaller than a size of the slit in the second sub-pixel unit along the second direction, and the second direction intersects the first direction.

According to an embodiment of the present disclosure, the first electrode is provided with a plurality of slits, the first electrode includes a plurality of electrode portions extending along the first direction, and two adjacent electrode portions are separated from each other by at least one of the slits; and
  wherein a size of the electrode portion in the first sub-pixel unit along the second direction is greater than a size of the electrode portion in the second sub-pixel unit along the second direction.

According to an embodiment of the present disclosure, the size of the slit along the second direction is smaller than the size of the electrode portion along the second direction.

According to an embodiment of the present disclosure, the first electrode is a comb-shaped electrode, and the electrode portion includes a comb tooth of the comb-shaped electrode.

According to an embodiment of the present disclosure, the at least one of the sub-pixel units further includes a black matrix disposed on a side of the first electrode away from the first base substrate;
  wherein the black matrix includes a first light-shielding portion and a second light-shielding portion that are arranged in a third direction, and a third light-shielding portion located between the first light-shielding portion and the second light-shielding portion, wherein the opening region of the sub-pixel unit is defined by the first light-shielding portion, the second light-shielding portion and the third light-shielding portion define the opening region of the sub-pixel unit; and
  wherein a size of the third light-shielding portion of the first sub-pixel unit along a fourth direction is greater than a size of the third light-shielding portion of the second sub-pixel unit along the fourth direction, wherein the fourth direction intersects the third direction.

According to an embodiment of the present disclosure, the third direction is the same as the first direction.

According to an embodiment of the present disclosure, the at least one of the sub-pixel units further includes a liquid crystal layer disposed on a side of the first electrode away from the first base substrate; and
  wherein a thickness of the liquid crystal layer in the first sub-pixel unit is smaller than a thickness of the liquid crystal layer in the second sub-pixel unit.

According to an embodiment of the present disclosure, the display panel further includes a second base substrate disposed opposite to the first base substrate, and the at least one of the sub-pixel units further includes a spacer layer disposed between the liquid crystal layer and the second base substrate; and wherein the spacer layer is configured to cause, after the first base substrate and the second base substrate are assembled, the thickness of the liquid crystal layer in the first sub-pixel unit being smaller than the thickness of the liquid crystal layer in the second sub-pixel unit.

According to an embodiment of the present disclosure, the spacer layer includes a planarization layer, and a thickness of the planarization layer in the first sub-pixel unit is greater than a thickness of the planarization layer in the second sub-pixel unit.

According to an embodiment of the present disclosure, the at least one of the sub-pixel units further includes an alignment layer disposed on a side of the first electrode away from the first base substrate; and
  wherein a pretilt angle of the alignment layer in the first sub-pixel unit is greater than a pretilt angle of the alignment layer in the second sub-pixel unit.

According to an embodiment of the present disclosure, the sub-pixel unit further includes a color filter layer disposed on a side of the first electrode away from the first base substrate; and
  wherein a color of the color filter layer in the first sub-pixel unit is different from a color of the color filter layer in the second sub-pixel unit.

According to an embodiment of the present disclosure, the color of the color filter layer in the second sub-pixel unit includes red and blue when the color of the color filter layer in the first sub-pixel unit includes green, and the color of the color filter layer in the second sub-pixel unit includes blue when the color of the color filter layer in the first sub-pixel unit includes red.

A second aspect of the present disclosure provides a display device including the above-mentioned display panel.

BRIEF DESCRIPTION OF THE DRAWINGS

The foregoing and other objects, features and advantages of the present disclosure will become more apparent from the following description of embodiments of the present disclosure with reference to the accompanying drawings, in which.

DETAILED DESCRIPTION OF EMBODIMENTS

Figure 1:
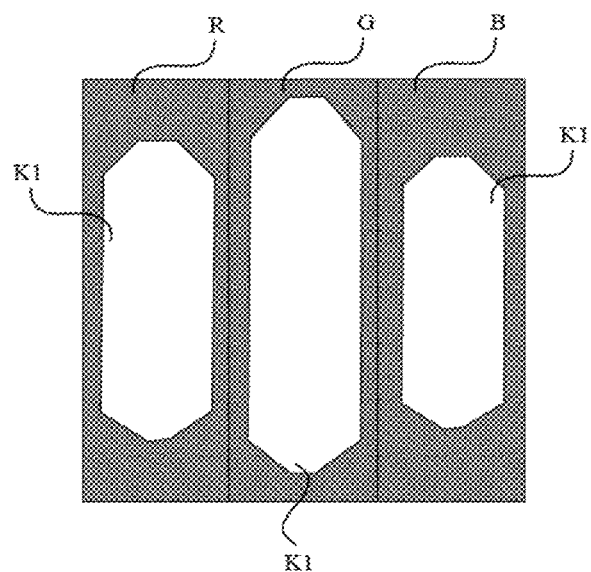
FIG. 1 schematically shows a plan view of a display panel in a proportional scale.

In order to make the objectives, technical solutions and advantages of the embodiments of the present disclosure more clear, the technical solutions of the embodiments of the present disclosure will be clearly and completely described below with reference to the accompanying drawings. Obviously, the described embodiments are some, but not all, embodiments of the present disclosure. Based on the described embodiments of the present disclosure, all other embodiments obtained by those of ordinary skill in the art without creative efforts fall within the protection scope of the present disclosure.

It should be noted that, the size and relative size of the element in the drawings may be exaggerated for clarity and/or descriptive purposes. As such, the size and relative size of the various elements are not necessarily limited to those shown in the figures. In the specification and drawings, the same or similar reference numeral refers to the same or similar element.

When an element is described as being "on", "connected to", or "coupled to" another element, the element may be directly on the another element, directly connected to the another element, directly coupled to the another element or a intervening element may be present. However, when an element is described as being "directly on", "directly connected to", or "directly coupled to" another element, there is no intervening element present. Other terms and/or expressions used to describe the relationship between elements should be interpreted in a similar fashion, e.g., "between" versus "directly between", "adjacent" versus "directly adjacent" or "on" versus "directly on" etc. Furthermore, the term "connection" may refer to a physical connection, an electrical connection, a communication connection, and/or a fluid connection. In addition, the X, Y, and Z axes are not limited to the three axes of the rectangular coordinate system, and may be interpreted in a broader sense. For example, the X, Y, and Z axes may be perpendicular to each other, or may represent different directions that are not perpendicular to each other. For the purposes of the present disclosure, "at least one of X, Y, and Z" and "at least one selected from the group consisting of X, Y, and Z" may be interpreted as X only, Y only, Z only, or any combination of two or more of X, Y and Z such as XYZ, XY, YZ and XZ. As used herein, the term "and/or" includes any and all combinations of one or more of the associated listed items.

It should be noted that, although the terms "first", "second", etc. may be used herein to describe various parts, components, elements, regions, layers and/or sections, these parts, components, elements, regions, layers and/or sections should not be limited by these terms. Rather, these terms are used to distinguish one part, component, element, region, layer and/or section from another. Thus, for example, the first part, first component, first element, first region, first layer and/or first section discussed below could be termed the second part, second component, second element, second region, second layer and/or second section, which are not departing from the teachings of the present disclosure.

For ease of description, the terms of spatial relationship, e.g., "up", "down", "left", "right", etc. may be used herein to describe the relationship between one element or feature and another element or feature as shown in the figures. It should be understood that the terms of spatial relationship are intended to encompass other different orientations of the device in use or operation in addition to the orientation depicted in the figures. For example, if the device in the figures is turned over, elements described as "below" or "beneath" other elements or features would be oriented to "on" or "above" the other elements or features.

Those skilled in the art should understand that herein, unless otherwise specified, the expression "thickness" refers to a size along a direction perpendicular to a surface of a display panel on which respective film layers are disposed, that is, a size along a light emitting direction of the display panel.

In this paper, unless otherwise specified, the expression "patterning process" generally includes steps of photoresist coating, exposure, development, etching, and photoresist stripping. The expression "one patterning process" refers to a process of forming patterned layers, features, members, etc. using one mask.

It should be noted that, herein, the expressions "same layer", "disposed in the same layer" or similar refer to a layer structure formed by forming a film layer for forming a specific pattern through one film forming process, and then patterning the film layer through one patterning process using one mask. One patterning process may include multiple exposure processes, development processes or etching processes, depending on the specific pattern. Specific pattern in the formed layer structure may be continuous or discontinuous. Such specific pattern may be at different heights or have different thicknesses.

In this paper, unless otherwise stated, the expression "electrically connected" may mean that two components or elements are directly electrically connected, e.g., a component or element A is in direct contact with a component or element B, and an electrical signal may be transmitted between the two; it may also mean that two components or elements are electrically connected through a conductive medium such as a conductive wire, e.g., the component or element A is electrically connected to the component or element B through the conductive wire to transmit the electrical signal between the two components or elements: it may also mean that two components or elements are electrically connected by at least one electronic component, e.g., the component or element A is electrically connected with the component or element B through at least one thin film transistor to transmit the electrical signal between the two components or elements.

FIG. 1 schematically shows a plan view of a display panel in a proportional scale. As shown in FIG. 1, a sensor structure is integrated in the display panel in the in-cell display technology. Compared with a traditional display panel, sensor lines are integrated in an in-cell display panel. This requires the black matrix to have a larger width in some sub-pixels to achieve the shielding of the sensor lines. For example, as shown in FIG. 1, the display panel includes a red sub-pixel R, a green sub-pixel G and a blue sub-pixel B. An area of an opening K1 of the green sub-pixel G is greater than an area of an opening K1 of the red sub-pixel R and an area of an opening K1 of the blue sub-pixel B, so that the transmittance of the green sub-pixel to be greater than the transmittance of the red sub-pixel and the transmittance of the blue sub-pixel, thereby affecting the image quality of the display panel.

Figure 2:
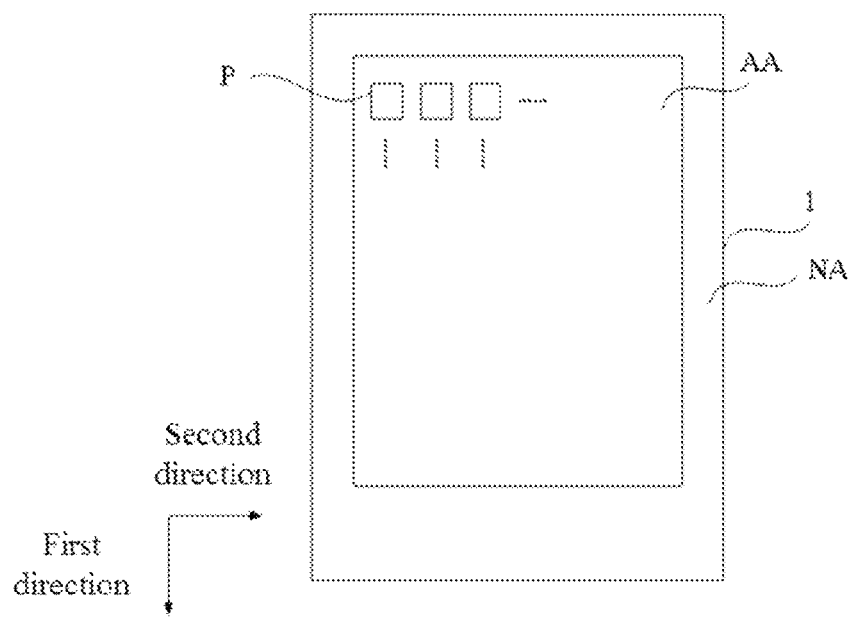
FIG. 2 schematically shows a plan view of a display panel in an embodiment of the present disclosure.

In view of this, an embodiment of the present disclosure provides a display panel. FIG. 2 schematically shows a plan view of the display panel in the embodiment of the present disclosure. As shown in FIG. 2, the display panel may be divided into a display region AA and a non-display region NA located outside the display region AA. For example, the non-display region NA is arranged around the display region AA. The display panel includes a first base substrate 1 and a plurality of pixel units P disposed on the first base substrate 1. The plurality of pixel units P are disposed in the display region AA. The plurality of pixel units P may be arranged in an array along a first direction and a second direction.

Figure 3:
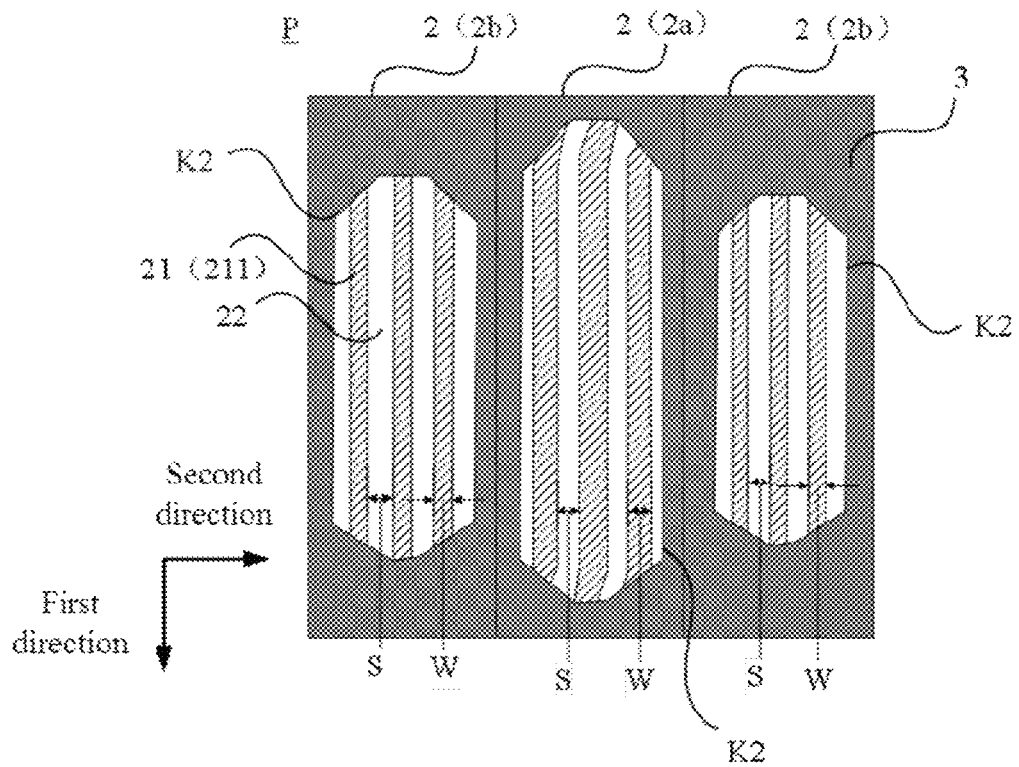
FIG. 3 schematically shows one of plan views of a pixel unit in an embodiment of the present disclosure.

FIG. 3 schematically shows one of plan views of the pixel unit in the embodiment of the present disclosure. As shown in FIG. 2 and FIG. 3, each pixel unit P includes a plurality of sub-pixel units 2. The plurality of sub-pixel units 2 are arranged on the first base substrate 1. In one pixel unit P, each sub-pixel unit 2 may display one color. Different sub-pixel units 2 display different colors. For example, each pixel unit P includes a red sub-pixel unit, a green sub-pixel unit and a blue sub-pixel unit.

The plurality of sub-pixel units 2 include a first sub-pixel unit 2a and a second sub-pixel unit 2b. A size of an opening region K2 of the first sub-pixel unit 2a along the first direction is greater than a size of an opening region K2 of the second sub-pixel unit 2b along the first direction. When a size of the opening region K2 of the first sub-pixel unit 2a along the second direction is greater than or equal to a size of the opening region K2 of the second sub-pixel unit 2b along the second direction, an aperture ratio of the first sub-pixel unit 2a is greater than an aperture ratio of the second sub-pixel unit 2b.

At least one sub-pixel unit 2 includes a first electrode 21 disposed on the first base substrate 1. The first electrode 21 is provided with at least one slit 22 extending along the first direction. An orthographic projection of the slit 22 on the first base substrate 1 is located within a range of an orthographic projection of the opening region K2 of the sub-pixel unit 2 on the first base substrate 1. A size S of the slit 22 in the first sub-pixel unit 2a along the second direction is smaller than a size S of the slit 22 in the second sub-pixel unit 2b along the second direction. The second direction intersects with the first direction.

In an embodiment of the present disclosure, the first sub-pixel unit 2a may be the above-mentioned green sub-pixel unit, and the second sub-pixel unit 2a may be the above-mentioned red sub-pixel unit and blue sub-pixel unit. Alternatively, the first sub-pixel unit 2a may be the above-mentioned red sub-pixel unit, and the second sub-pixel unit 2a may be the above-mentioned blue sub-pixel unit.

Optionally, when the first sub-pixel unit 2a is the above-mentioned green sub-pixel unit and the second sub-pixel unit 2a is the above-mentioned red sub-pixel unit and blue sub-pixel unit, a size of the opening region K2 of the green sub-pixel unit along the first direction is greater than a size of the opening region K2 of the red sub-pixel unit along the first direction, and the size of the opening region K2 of the red sub-pixel unit along the first direction is greater than a size of the opening region K2 of the blue sub-pixel unit along the first direction. A size of the opening region K2 of the green sub-pixel unit along the second direction, a size of the opening region K2 of the red sub-pixel unit along the second direction, and a size of the opening region K2 of the blue sub-pixel unit along the second direction are approximately the same. That is, the aperture ratio of the green sub-pixel unit, the aperture ratio of the red sub-pixel unit, and the aperture ratio of the blue sub-pixel unit descend in this order. For example, the aperture ratio of the green sub-pixel unit is 70%, the aperture ratio of the red sub-pixel unit is 60%, and the aperture ratio of the blue sub-pixel unit is 50%.

The opening region K2 of the sub-pixel unit 2 may refer to a region of the sub-pixel unit 2 through which light may transmit. For example, the sub-pixel unit 2 further includes a black matrix 3 located on a side of the first electrode 21 away from the first substrate 1. The black matrix 3 includes a light-shielding material. The black matrix 3 itself is used to block the passage of light. The black matrix 3 is provided with hollow regions. The light may exit through the hollow regions on the black matrix 3. The hollow region on the black matrix 3 may define the opening region K2 of the sub-pixel unit 2.

The first direction may refer to a direction from the first row of pixel units P to the last row of pixel units P among the plurality of pixel units P. That is, the first direction is a vertical direction in FIG. 3.

The first electrode may refer to a pixel electrode of the sub-pixel unit 2. The sub-pixel unit 2 further includes a liquid crystal layer and a common electrode. The pixel electrode and the common electrode may be arranged on opposite sides of the liquid crystal layer, or may be arranged on the same side of the liquid crystal layer. The pixel electrode and the common electrode may generate an electric field in response to a driving signal. Liquid crystal in the liquid crystal layer may be deflected under the driving of the electric field, thereby achieving the display function.

Optionally, the second direction may be perpendicular to the first direction. That is, the second direction is a direction from the first column of pixel units P to the last column of pixel units P pointed. That is, the second direction is a horizontal direction shown in FIG. 3. A size S of the slit 22 along the second direction may refer to a width of the slit 22.

Optionally, when the first sub-pixel unit 2a is the above-mentioned green sub-pixel unit and the second sub-pixel unit 2a is the above-mentioned red sub-pixel unit and blue sub-pixel unit, a size S of the slit 22 in the green sub-pixel unit along the second direction is smaller than a size S of the slit 22 in the red sub-pixel unit along the second direction, and the size S of the slit 22 in the red sub-pixel unit along the second direction is smaller than or equal to a size S of the slit 22 in the blue sub-pixel unit along the second direction. That is, in an example, the width of the slit 22 in the green sub-pixel unit, the width of the slit 22 in the red sub-pixel unit and the width of the slit 22 in the blue sub-pixel unit may ascend in this order.

Optionally, the first electrode 21 includes a plurality of electrode portions 211. A specific structure of the electrode portion 211 will be described in detail below, which will not be repeated here. In an embodiment of the present disclosure, the width of the slit(s) 22 on the first electrode may be adjusted by changing the size of the electrode portions 211 or changing the number of the electrode portions 211. For example, the width of the slit(s) 22 may be reduced by increasing the width of the electrode portions 211 or increasing the number of the electrode portions 211.

With the display panel of the embodiment of the present disclosure, the transmittance of the sub-pixel unit 2 may be changed by changing the width of the slit 22 on the first electrode 21 in the sub-pixel unit 2. The transmittance of the sub-pixel unit 2 increases as the width of the slit 22 increases. In this way, even if there is a difference between the aperture ratio of the first sub-pixel unit 2a and the aperture ratio of the second sub-pixel unit 2b, in the embodiment of the present disclosure, when the width of the slit 22 in the first sub-pixel unit 2a is caused to be smaller than the width of the slit 22 in the second sub-pixel unit 2b, a difference between the transmittance of the first sub-pixel unit 2a and the transmittance of the second sub-pixel unit 2b will be reduced, thereby improving an adverse effect on the image quality due to the transmittance difference and improving the display effect.

It should be noted that, in FIGS. 2 and 3, the pixel unit P and the sub-pixel unit 2 are schematically shown in a rectangular shape. However, this does not constitute a limitation on the shapes of the pixel unit P and the sub-pixel unit 2 in the embodiment of the present disclosure.

The display panel of the embodiment of the present disclosure will be further described below with reference to FIGS. 2 to 9.

Figure 4:
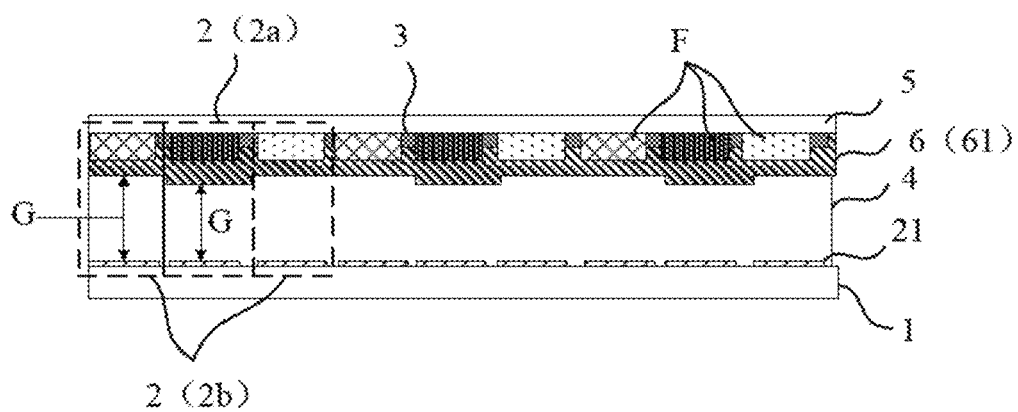
FIG. 4 schematically shows one of cross-sectional views of a pixel unit in an embodiment of the present disclosure.

FIG. 4 schematically shows one of cross-sectional views of a pixel unit in an embodiment of the present disclosure. As shown in FIGS. 2 to 4, in some embodiments, the sub-pixel unit 2 further includes a color filter layer F disposed on the side of the first electrode 21 away from the first base substrate 1. The color of the color filter layer F in the first sub-pixel unit 2a is different from the color of the color filter layer F in the second sub-pixel unit 2b.

For example, the color of the color filter layer F in the first sub-pixel unit 2a may include green or red. That is, the first sub-pixel unit 2a may be the above-mentioned green sub-pixel unit or red sub-pixel unit. The color of the color filter layer F in the second sub-pixel unit 2a may include red and/or blue. That is, the second sub-pixel unit 2a is the above-mentioned red sub-pixel unit or blue sub-pixel unit, or the second sub-pixel unit 2a is the above-mentioned red sub-pixel unit and blue sub-pixel unit.

In some embodiments, when the color of the color filter layer F in the first sub-pixel unit 2a includes green, the color of the color filter layer F in the second sub-pixel unit 2b includes red and blue. That is, the first sub-pixel unit 2a is the above-mentioned green sub-pixel unit, and the second sub-pixel unit 2a is the above-mentioned red sub-pixel unit and blue sub-pixel unit. When the color of the color filter layer F in the first sub-pixel unit 2a includes red, the color of the color filter layer F in the second sub-pixel unit 2b includes blue. That is, the first sub-pixel unit 2a is the above-mentioned red sub-pixel unit, and the second sub-pixel unit 2a is the above-mentioned blue sub-pixel unit.

In some embodiments, the number of slits 22 is greater than one. The first electrode 21 includes a plurality of electrode portions 211 extending along the first direction. Two adjacent electrode portions 211 are separated from each other by at least one slit 22. A size W of the electrode portion 211 in the first sub-pixel unit 2a along the second direction is greater than a size W of the electrode portion 211 in the second sub-pixel unit 2b along the second direction.

In the embodiment of the present disclosure, the two adjacent electrode portions 211 refer to no other electrode portion 211 exists between the two electrode portions 211 in the second direction. Optionally, any two adjacent electrode portions 211 are separated from each other by a slit 22 in each sub-pixel unit 2. As mentioned above, the second direction may be perpendicular to the first direction. The size W of the electrode portion 211 along the second direction may refer to the width of the electrode portion 211.

For example, when the first sub-pixel unit 2a is the above-mentioned green sub-pixel unit and the second sub-pixel unit 2a is the above-mentioned red sub-pixel unit and blue sub-pixel unit, a size W of the electrode portion 211 in the green sub-pixel unit along the second direction is greater than a size W of the electrode portion 211 in the red sub-pixel unit along the second direction, and the size W of the electrode portion 211 in the red sub-pixel unit along the second direction is greater than or equal to a size W of the electrode portion 211 in the blue sub-pixel unit along the second direction. That is, in an example, the width of the electrode portion 211 in the green sub-pixel unit, the width of the electrode portion 211 in the red sub-pixel unit and the width of the electrode portion 211 in the blue sub-pixel unit may descend in this order.

In some embodiments, the size S of the slit 22 along the second direction is smaller than the size W of the electrode portion 211 along the second direction, so that the width of the slit 22 will not be too large, thereby ensuring the size of the electrode portion 211 is sufficient to satisfy electrical properties such as lower electrical loss.

Exemplarily, when the first sub-pixel unit 2a is the above-mentioned green sub-pixel unit and the second sub-pixel unit 2a is the above-mentioned red sub-pixel unit and blue sub-pixel unit:

the width of the electrode portion 211 in the green sub-pixel unit may be set between 1.8 μm and 2.2 μm, for example, 2.0 μm, and the width of the slit in the green sub-pixel unit may be set between 3.6 μm and 4.4 μm, for example, an interval of 4.0 μm;

the width of the electrode portion 211 in the red sub-pixel unit may be set between 2.0 μm and 2.4 μm, for example, 2.2 μm, and the width of the slit in the red sub-pixel unit may be set between 3.2 μm and 3.8 μm, for example, an interval of 3.5 μm;

the width of the electrode portion 211 in the blue sub-pixel unit may be set between 2.2 μm and 2.6 μm, for example, 2.4 μm, and the width of the slit in the blue sub-pixel unit may be set between 2.8 μm and 3.4 μm, for example, an interval of 3.1 μm.

In some embodiments, the first electrode 21 is a comb-shaped electrode. The comb-shaped electrode is divided into a comb handle and a comb tooth. Devices such as a thin film transistor may be arranged on the comb handle of the comb-shaped electrode. The electrode portion 211 includes the comb tooth of the comb-shaped electrode. Signals such as a data voltage provided by the a data line in the display panel may be transmitted to the electrode portion 211 through the thin film transistor, so that the electric field may be formed between the common electrode and the electrode portion 211 to drive the liquid crystal in the liquid crystal layer to deflect, thereby achieving the display function.

Figure 5:
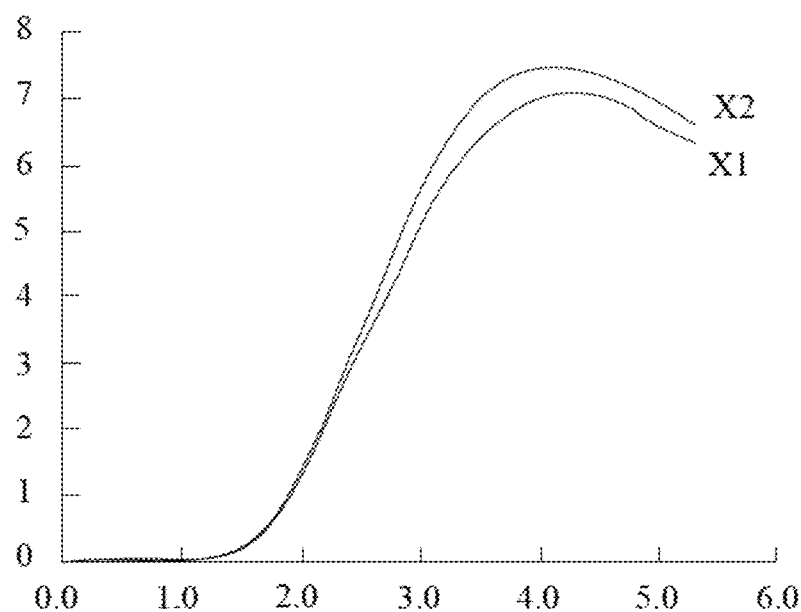
FIG. 5 schematically shows a schematic diagram of the relationship between a ratio of a width of an electrode portion with respect to a width of a slit and the transmittance in this embodiment.

FIG. 5 schematically shows a schematic diagram of the relationship between a ratio of a width of an electrode portion with resect to a width of a slit and the transmittance in this embodiment. As shown in FIG. 5, the abscissa represents the magnitude of the driving voltage, and the ordinate represents the transmittance. X1 represents a first ratio of width, X2 represents a second ratio of width, and X1 is greater than X2. It may be clearly seen from the figure that when the width of the slit 22 is larger and the width of the electrode portion 211 is smaller so that the second ratio of width X2 is obtained, the transmittance may be significantly improved, thereby improving the transmittance difference between different sub-pixel units 2.

Figure 6:
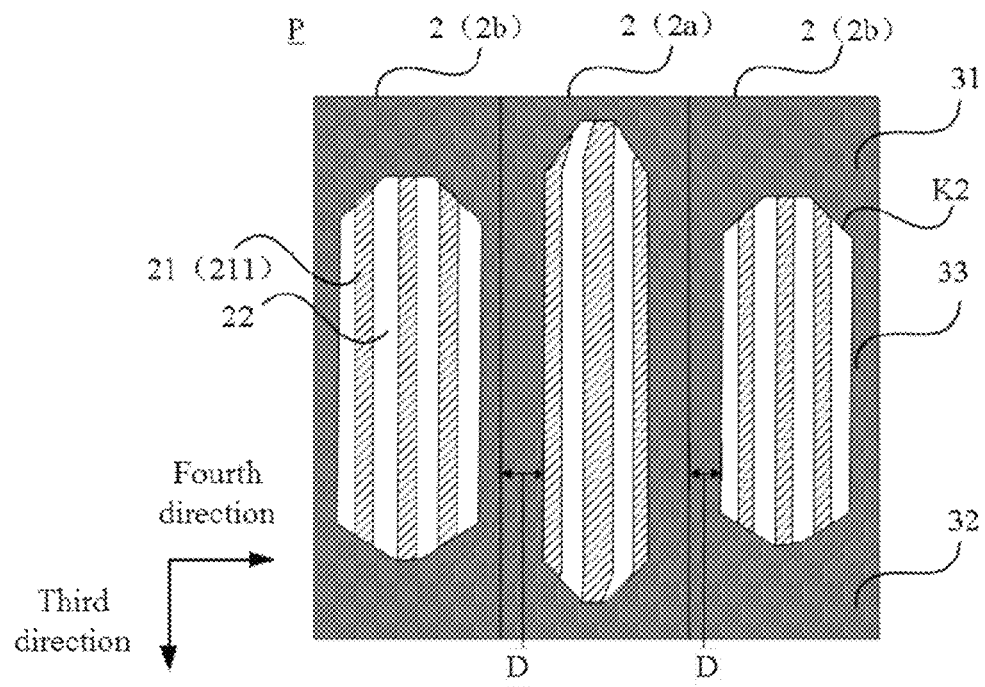
FIG. 6 schematically shows another plan view of a pixel unit in an embodiment of the present disclosure.

FIG. 6 schematically shows another plan view of a pixel unit in an embodiment of the present disclosure. As shown in FIG. 6, in some embodiments, the at least one sub-pixel unit 2 further includes a black matrix 3 disposed on the side of the first electrode 21 away from the first base substrate 1. The black matrix 3 includes a first light-shielding portion 31 and a second light-shielding portion 32 that are arranged in a third direction, and a third light-shielding portion 33 located between the first light-shielding portion 31 and the second light-shielding portion 32. The opening region K2 of the sub-pixel unit 2 is defined by the first light-shielding portion 31, the second light-shielding portion 32 and the third light-shielding portion 33. A size D of the third light-shielding portion 33 of the first sub-pixel unit 2a along a fourth direction is greater than a size D of the third light-shielding portion 33 of the second sub-pixel unit 2b along the fourth direction. The fourth direction intersects with the third direction.

In some embodiments, the third direction is in the same direction as the first direction. That is, the third direction is the direction from the first row of pixel units P to the last row of pixel units P. Optionally, the fourth direction is perpendicular to the third direction. That is, the fourth direction is the direction from the first column of pixel units P to the last column of pixel units P. The size D of the third light-shielding portion 33 along the fourth direction may refer to a width of the third light-shielding portion 33.

For example, when the first sub-pixel unit 2a is the above-mentioned green sub-pixel unit and the second sub-pixel unit 2a is the above-mentioned red sub-pixel unit and blue sub-pixel unit, a size D of the third light-shielding portion 33 in the green sub-pixel unit along the fourth direction is greater than a size D of the third light-shielding portion 33 in the red sub-pixel unit along the fourth direction, and the size D of the third light-shielding portion 33 in the red sub-pixel unit along the fourth direction is greater than or equal to a size D of the third light-shielding portion 33 in the blue sub-pixel unit along the fourth direction. That is, in an example, the width of the third light-shielding portion 33 in the green sub-pixel unit, the width of the third light-shielding portion 33 in the red sub-pixel unit and the width of the third light-shielding portion 33 in the blue sub-pixel unit may descend in this order. For example, the width of the third light-shielding portion 33 in the green sub-pixel unit may be set between 7 μm and 8 μm, for example, 7.5 μm. The width of the third light-shielding portion 33 in the red sub-pixel unit may be set between 6 μm and 7 μm, for example, 6.5 μm. The width of the third light-shielding portion 33 in the blue sub-pixel unit may be set between 5.5 μm and 6.5 μm, for example, 6.0 μm.

As described above, the size of the opening region K2 of the green sub-pixel unit along the first direction is greater than the size of the opening region K2 of the red sub-pixel unit along the first direction, and the size of the opening region K2 of the red sub-pixel unit along the first direction is greater than the size of the opening region K2 of the blue sub-pixel unit along the first direction. In other words, the size of the opening regions K2 along the first direction in the green sub-pixel unit, the size of the opening regions K2 along the first direction in the red sub-pixel unit and the size of the opening regions K2 along the first direction in the blue sub-pixel unit descend in this order. In the embodiment of the present disclosure, the width of the third light-shielding portion 33 in the green sub-pixel unit, the width of the third light-shielding portion 33 in the red sub-pixel unit and the width of the third light-shielding portion 33 in the blue sub-pixel unit descend in this order, so that the size of the opening region K2 along the second direction in the green sub-pixel unit, the size of the opening region K2 along the second direction in the red sub-pixel unit and the size of the opening region K2 along the second direction in the blue sub-pixel unit may ascend in this order, by gradually reducing. In this way, the difference in the aperture ratios of the green sub-pixel unit, the red sub-pixel unit and the blue sub-pixel unit may be reduced, thereby further improving the difference in the transmittances of the green sub-pixel unit, the red sub-pixel unit and the blue sub-pixel unit.

As shown in FIG. 4, in some embodiments, the at least one sub-pixel unit 2 futher includes a liquid crystal layer 4 disposed on the side of the first electrode 21 away from the first base substrate 1. A thickness G of the liquid crystal layer 4 in the first sub-pixel unit 2a is smaller than a thickness G of the liquid crystal layer 4 in the second sub-pixel unit 2b.

Figure 7:
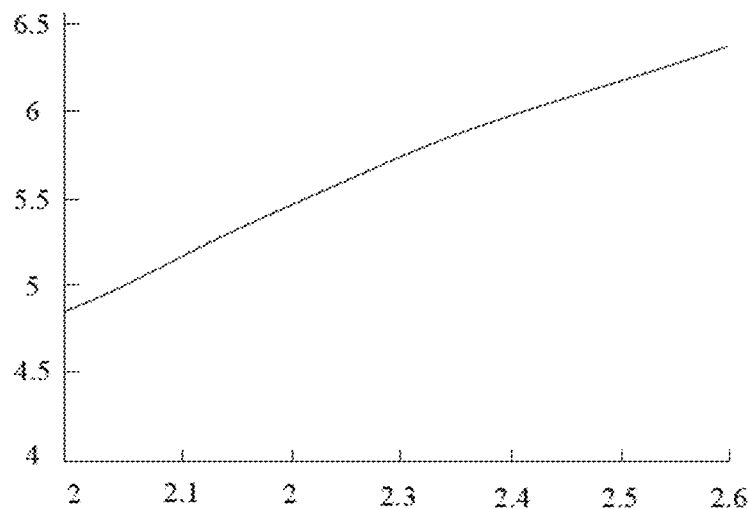
FIG. 7 schematically shows a schematic diagram of the relationship between a thickness of a liquid crystal layer and the transmittance in an embodiment of the present disclosure.

FIG. 7 schematically shows a schematic diagram of the relationship between a thickness of a liquid crystal layer and the transmittance in an embodiment of the present disclosure. The abscissa represents the thickness G of the liquid crystal layer 4, and the ordinate represents the transmittance. As shown in FIG. 7, the transmittance of the sub-pixel unit 2 varies as the thickness G of the liquid crystal layer 4 in the sub-pixel unit 2. In addition, the transmittance of the sub-pixel unit 2 is decreased as the thickness G of the liquid crystal layer 4 decreases. In this way, the difference between the transmittance of the first sub-pixel unit 2a and the transmittance of the second sub-pixel unit 2b may be further reduced, by setting the thickness G of the liquid crystal layer 4 in the first sub-pixel unit 2a being smaller than the thickness G of the liquid crystal layer 4 in the second sub-pixel unit 2b, thereby improving the image quality.

For example, when the first sub-pixel unit 2a is the above-mentioned green sub-pixel unit and the second sub-pixel unit 2a is the above-mentioned red sub-pixel unit and blue sub-pixel unit, a thickness G of the liquid crystal layer 4 in the green sub-pixel unit is smaller than a thickness G of the liquid crystal layer 4 in the red sub-pixel unit, and the thickness G of the liquid crystal layer 4 in the red sub-pixel unit is smaller than or equal to a thickness G of the liquid crystal layer 4 in the blue sub-pixel unit. That is, in an example, the thickness G of the liquid crystal layer 4 in the green sub-pixel unit, the thicknesses G of the liquid crystal layer 4 in the red sub-pixel unit and the thicknesses G of the liquid crystal layer 4 in the blue sub-pixel unit may ascend in this order.

It should be noted that the transmittance of the sub-pixel unit 2 mentioned in the embodiments of the present disclosure refers to the transmittance under a specific driving voltage. The difference in transmittance between respective sub-pixel units 2 refers to the difference in transmittance between respective sub-pixel units 2 under the same driving voltage.

As shown in FIG. 4, in some embodiments, the display panel further includes a second base substrate 5 disposed opposite to the first base substrate 1. The at least one sub-pixel unit 2 further includes a spacer layer 6 disposed between the liquid crystal layer 4 and the second base substrate 5. The spacer layer 6 is configured to cause the thickness G of the liquid crystal layer 4 in the first sub-pixel unit 2a being smaller than the thickness G of the liquid crystal layer 4 in the second sub-pixel unit 2b after the first base substrate 1 and the second base substrate 5 are assembled.

In the embodiment of the present disclosure, a film layer (e.g. the first electrode 21) on the first base substrate 1 and a film layer (e.g. the spacer layer 6) on the second base substrate 5 may be prepared separately. Then, the film layer on the first base substrate 1 is combined with the film layer on the second base substrate 5 through the cell assembling process, to obtain the display panel. When preparing the spacer layer 6 on the second base substrate 5, a surface of the spacer layer 6 in the first sub-pixel unit 2a close to a side of the liquid crystal layer 4 may be caused to protrude from a surface of the spacer layer 6 in the second sub-pixel unit 2b close to the side of the liquid crystal layer 4, by adding a spacer or changing thicknesses of some film layers. In this way, after the first base substrate 1 and the second base substrate 5 are assembled, the thickness G of the liquid crystal layer 4 in the first sub-pixel uit 2a may be smaller than the thickness G of the liquid crystal layer 4 in the second sub-pixel unit 2b.

In some embodiments, the spacer layer 6 includes a planarization layer 61. A thickness of the planarization layer 61 in the first sub-pixel unit 2a is greater than a thickness of the planarization layer 61 in the second sub-pixel unit 2b.

In the embodiment of the present disclosure, the planarization layer 61 in the first sub-pixel unit 2a and the planarization layer 61 in the second sub-pixel unit 2b may be prepared by a single film formation process or multiple film formation processes. For example, when the planarization layer 61 in the first sub-pixel unit 2a and the planarization layer 61 in the second sub-pixel unit 2b are prepared by the single film formation process, the planarization layer 61 may be prepared by a halftone mask (HTM) process, so that the thickness of the planarization layer 61 in the first sub-pixel unit 2a is greater than the thickness of the planarization layer 61 in the second sub-pixel unit 2b.

In other embodiments, the thickness G of the liquid crystal layer 4 may also be changed by adjusting a structure of a part of the film layer located on a side of the liquid crystal layer 4 close to the first base substrate 1. For details, reference may be made to the foregoing embodiments, which are not listed exhaustively here.

Figure 8:
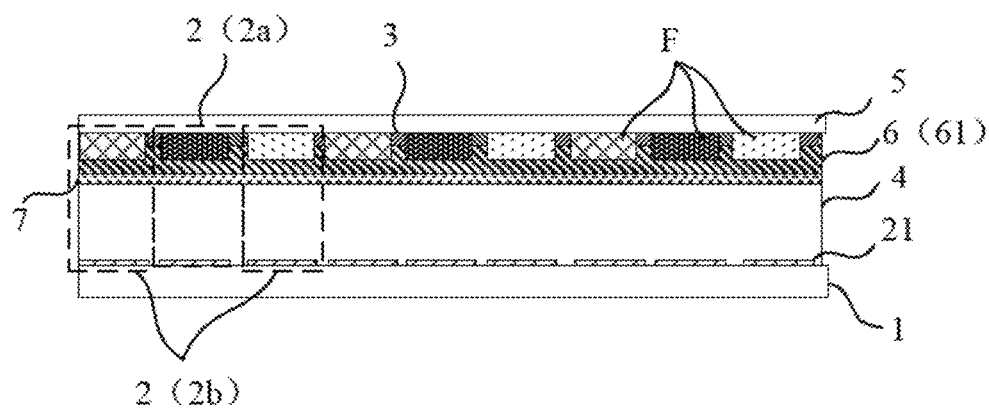
FIG. 8 schematically shows another cross-sectional view of a pixel unit in an embodiment of the present disclosure.

FIG. 8 schematically shows another cross-sectional view of a pixel unit in an embodiment of the present disclosure. As shown in FIG. 8, in some embodiments, the at least one sub-pixel unit 2 further includes an alignment layer 7 disposed on the side of the first electrode 21 away from the first base substrate 1. A pretilt angle of the alignment layer 7 in the first sub-pixel unit 2a is greater than a pretilt angle of the alignment layer 7 in the second sub-pixel unit 2b.

Figure 9:
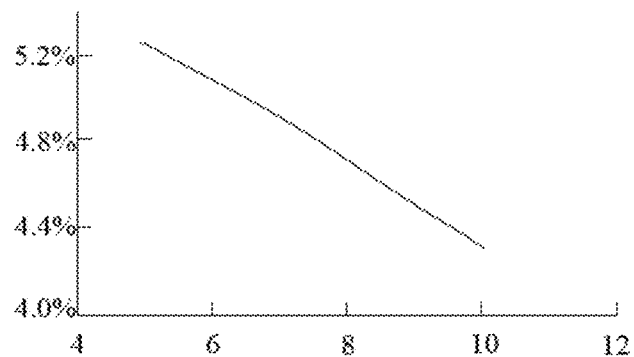
FIG. 9 schematically shows a schematic diagram of the relationship between a pretilt angle of an alignment layer and the transmittance in an embodiment of the present disclosure.

In the embodiment of the present disclosure, the pretilt angle of the alignment layer 7 refers to a deflection angle that the liquid crystal in the liquid crystal layer 4 may achieve under the action of the alignment layer 7 when no electric field is supplied to the liquid crystal layer 4. FIG. 9 schematically shows a schematic diagram of the relationship between a pretilt angle of an alignment layer and the transmittance in an embodiment of the present disclosure. As shown in FIG. 9, the transmittance of the sub-pixel unit 2 is changed as the pretilt angle of the alignment layer 7 in the sub-pixel unit 2 is changed. In addition, the transmittance of the sub-pixel unit 2 decreases as the pretilt angle of the alignment layer 7 decreases. In this way, by setting the pretilt angle of the alignment layer 7 in the first sub-pixel unit 2a to be smaller than the pretilt angle of the alignment layer 7 in the second sub-pixel unit 2b, the transmittance difference between the first sub-pixel unit 2a and the second sub-pixel unit 2b may be further reduced, thereby improving the image quality.

For example, when the first sub-pixel unit 2a is the above-mentioned green sub-pixel unit and the second sub-pixel unit 2a is the above-mentioned red sub-pixel unit and blue sub-pixel unit, a pretilt angle of the alignment layer 7 in the green sub-pixel unit is smaller than a pretilt angle of the alignment layer 7 in the red sub-pixel unit, and the pretilt angle of the alignment layer 7 in the red sub-pixel unit is smaller than or equal to a pretilt angle of the alignment layer 7 in the blue sub-pixel unit. That is, in an example, the pretilt angle of the third alignment layer 7 in the green sub-pixel unit, the pretilt angle of the red sub-pixel unit and the pretilt angle of the blue sub-pixel unit may ascend in this order. For example, the pretilt angle of the alignment layer 7 in the green sub-pixel unit may be set between 4.59 to 5.5", for example, 5°. The pretilt angle of the alignment layer 7 in the red sub-pixel uit may be set between 6.5° to 7.5°, for example, 7°. The pretilt angle of the alignment layer 7 in the blue sub-pixel unit may be set between 8.5° to 9.5°, for example, 99.

In the embodiments of the present disclosure, the above-mentioned embodiments may be combined in various ways, which will not be listed exhaustively here. Through the combination of the above embodiments, it is possible for the first sub-pixel unit 2a and the second sub-pixel unit 2b, which have a difference in aperture ratio being greater than 30%, to have substantially the same transmittance, thereby greatly mitigating the affection on image quality due to the transmittance difference.

The present disclosure further provides a display device including the above-mentioned display panel.

In other embodiments of the present disclosure, the display device may include a tablet personal computer (PC), a smart phone, a personal digital assistant (PDA), a portable multimedia player, a game console, a wristwatch-type electronic device, and the like. However, the embodiments of the present disclosure are not intended to limit the types of display devices. In some exemplary embodiments, the display device may be used not only in large electronic devices such as a television set (TV) or a external billboard, but also in medium or small electronic devices such as a PC, a notebook computer, a car navigation device, or a camera. Those skilled in the art may understand that various combinations and/or conjunctions of features recited in various embodiments and/or claims of the present disclosure may be made, even if such combinations or conjunctions are not expressly recited in the present disclosure. In particular, various combinations and/or conjunctions of the features recited in the various embodiments of the present disclosure and/or in the claims may be made without departing from the spirit and teachings of the present disclosure. All such combinations and/or conjunctions fall within the scope of this disclosure.

What is claimed is:
1. A display panel, comprising:
 a plurality of sub-pixel units disposed on a first base substrate, wherein the plurality of sub-pixel units comprises a first sub-pixel unit and a second sub-pixel unit, and a size of an opening region of the first sub-pixel unit along a first direction is greater than a size of an opening region of the second sub-pixel unit along the first direction;

wherein at least one of the sub-pixel units comprises a first electrode disposed on the first base substrate, the first electrode is provided with at least one slit extending along the first direction, and an orthographic projection of the slit on the first base substrate is located within a range of an orthographic projection of the opening region of the sub-pixel unit on the first base substrate;

wherein a size of the slit in the first sub-pixel unit along a second direction is smaller than a size of the slit in the second sub-pixel unit along the second direction, and the second direction intersects the first direction;

wherein the at least one of the sub-pixel units further comprises a black matrix disposed on a side of the first electrode away from the first base substrate;

wherein the black matrix comprises a first light-shielding portion and a second light-shielding portion that are arranged in a third direction, and a third light-shielding portion located between the first light-shielding portion and the second light-shielding portion, wherein the opening region of the sub-pixel unit is defined by the first light-shielding portion, the second light-shielding portion and the third light-shielding portion define the opening region of the sub-pixel unit; and wherein a size of the third light-shielding portion of the first sub-pixel unit along a fourth direction is greater than a size of the third light-shielding portion of the second sub-pixel unit along the fourth direction, wherein the fourth direction intersects the third direction.

2. The display panel according to claim 1, wherein the first electrode is provided with a plurality of slits, the first electrode comprises a plurality of electrode portions extending along the first direction, and two adjacent electrode portions are separated from each other by at least one of the slits; and wherein a size of the electrode portion in the first sub-pixel unit along the second direction is greater than a size of the electrode portion in the second sub-pixel unit along the second direction.

3. The display panel according to claim 2, wherein a size of each of the plurality of silts along the second direction is smaller than a size of each of the plurality of electrode portions along the second direction.

4. The display panel according to claim 2, wherein the first electrode is a comb-shaped electrode, and the electrode portion comprises a comb tooth of the comb-shaped electrode.

5. The display panel according to claim 1, wherein the third direction is the same as the first direction.

6. The display panel according to claim 1, wherein the at least one of the sub-pixel units further comprises a liquid crystal layer disposed on a side of the first electrode away from the first base substrate; and wherein a thickness of the liquid crystal layer in the first sub-pixel unit is smaller than a thickness of the liquid crystal layer in the second sub-pixel unit.

7. The display panel according to claim 6, wherein the display panel further comprises a second base substrate disposed opposite to the first base substrate, and the at least one of the sub-pixel units further comprises a spacer layer disposed between the liquid crystal layer and the second base substrate; and wherein the spacer layer is configured to cause, after the first base substrate and the second base substrate are assembled, the thickness of the liquid crystal layer in the first sub-pixel unit being smaller than the thickness of the liquid crystal layer in the second sub-pixel unit.

8. The display panel according to claim 7, wherein the spacer layer comprises a planarization layer, and a thickness of the planarization layer in the first sub-pixel unit is greater than a thickness of the planarization layer in the second sub-pixel unit.

9. The display panel according to claim 1, wherein the at least one of the sub-pixel units further comprises an alignment layer disposed on a side of the first electrode away from the first base substrate; and wherein a pretilt angle of the alignment layer in the first sub-pixel unit is greater than a pretilt angle of the alignment layer in the second sub-pixel unit.

10. The display panel according to claim 1, wherein the sub-pixel unit further comprises a color filter layer disposed on a side of the first electrode away from the first base substrate; and wherein a color of the color filter layer in the first sub-pixel unit is different from a color of the color filter layer in the second sub-pixel unit.

11. The display panel according to claim 10, wherein the color of the color filter layer in the second sub-pixel unit comprises red and blue when the color of the color filter layer in the first sub-pixel unit comprises green, and the color of the color filter layer in the second sub-pixel unit comprises blue when the color of the color filter layer in the first sub-pixel unit comprises red.

12. A display device, comprising the display panel according to claim 1.

* * * * *